(12) United States Patent
Smith et al.

(10) Patent No.: US 6,856,245 B2
(45) Date of Patent: Feb. 15, 2005

(54) TIRE CONDITION MONITORING SYSTEM WITH IMPROVED SENSOR MEANS

(76) Inventors: Julian Smith, P.O. Box 260, Circleville, NY (US) 10919; Steven Holmbraker, 130 Monhagen Ave., Middletown, NY (US) 10940; William Campbell, III, 5 Wintergreen Ave., Newburgh, NY (US) 12550; Arlin Bartlett, 623 Winterton Rd., Bloomingburg, NY (US) 12721

( * ) Notice: Subject to any disclaimer, the term of this patent is extended or adjusted under 35 U.S.C. 154(b) by 29 days.

(21) Appl. No.: 10/615,192

(22) Filed: Jul. 9, 2003

(65) Prior Publication Data

US 2005/0007245 A1 Jan. 13, 2005

(51) Int. Cl.$^7$ ............................................. B60C 23/02
(52) U.S. Cl. ..................... 340/442; 340/447; 73/146.2; 73/146.3; 73/146.8
(58) Field of Search .................................. 340/442, 445, 340/447; 73/146, 146.2, 146.3, 146.8

(56) References Cited

U.S. PATENT DOCUMENTS

| | | | | |
|---|---|---|---|---|
| 4,945,337 A | * | 7/1990 | Huang | 340/442 |
| 5,465,772 A | * | 11/1995 | Sartor | 152/416 |
| 5,557,256 A | * | 9/1996 | Achterholt | 340/442 |
| 5,963,128 A | * | 10/1999 | McClelland | 340/447 |
| 5,977,870 A | * | 11/1999 | Rensel et al. | 340/447 |
| 6,034,596 A | * | 3/2000 | Smith et al. | 340/447 |

* cited by examiner

*Primary Examiner*—Daryl C. Pope
(74) *Attorney, Agent, or Firm*—Stevens, Davis, Miller & Mosher, LLP

(57) ABSTRACT

A sensor device mountable on a threaded valve stem of an inflatable tire of a vehicle having an actuating pin adapted to be depressed by a component of an air gauge or a connecting fixture of a compressed air line, generally consisting of a housing defining a closed chamber, having a first threaded opening permitting such housing to be threaded onto the valve stem, and a second opening; an abutment pin disposed in the housing engageable with the actuating pin of the valve stem for depressing the actuating pin of the valve stem and thereby opening the valve stem when the housing is threaded onto the valve stem, providing an intercommunication of the interiors of the tire and the housing; a valve disposed in the second opening of the housing having an actuating pin adapted to be depressed by the component of an air gauge or connecting fixture of a compressed air line; a sensor mounted in the housing for sensing the pressure in the housing chamber; a microcontroller connected to the pressure sensor for receiving and processing signals therefrom corresponding to sensed pressures; and a transmitter mounted on the housing and coupled to the processor for transmitting processed signals corresponding to sensed pressures.

31 Claims, 4 Drawing Sheets

TIRE CONDITION MONITORING SYSTEM WITH IMPROVED SENSOR MEANS

FIELD OF THE INVENTION

This invention relates to a system for monitoring certain conditions of inflated tires of vehicles, and more particularly to such a system having an improved sensor means.

BACKGROUND OF THE INVENTION

In U.S. Pat. No. 6,034,596, incorporated herein by reference, there is disclosed a system for monitoring the pressure and temperature of the tires of a vehicle which generally consists of a set of sensors mountable on the valve stems of the vehicle tires, and a control unit mounted on the vehicle, provided with means for transmitting signals between the control unit and the sensors. Each of such sensors generally includes a housing having a threaded opening, adapted to be threaded onto a tire valve stem to thereby intercommunicate the interior of the tire with the interior of the housing, and pressure and temperature sensors, a microcontroller, a transmitter/receiver and a power supply mounted within such housing. Such system operates in a manner whereby the control unit may selectively activate such sensors, query such sensors for pressure and temperature data which are transmitted to the control unit, process such transmitted data signals and display such processed data for the user.

Although such sensors have been highly effective in sensing pressure and temperature conditions when mounted on the valve stems of tires, and transmitting data signals corresponding to such conditions to the control unit, they present an obstacle when seeking to connect a compressed air line to the valve stems of the tires for adjusting the pressures of the having to remove and replace each sensor. Such requirement of removal and replacement of such sensors each time the inflation pressure of the tire is adjusted has been found to be an inconvenience to the user which renders the use of such sensors less attractive.

It thus is the principal object of the present invention to provide a sensor of the type described which does not require its removal and displacement each time the pressure of the tire on which it is mounted is adjusted.

SUMMARY OF THE INVENTION

The present invention overcomes the disadvantage of such prior art system in having to remove and replace a sensor each time the pressure of a tire is to be adjusted by providing a sensor including a housing defining a closed chamber, having a first threaded opening permitting the housing to be threaded onto the valve stem of a tire, and a second opening, an abutment disposed in the housing engageable with the pin of the valve stem for depressing such pin and thereby opening the valve stem when the housing is threaded onto the valve stem, thereby intercommunicating the interior of the tire and the housing chamber, a valve disposed in the second opening in the housing having a pin adapted to be depressed by a component of a compressed air line for supplying compressed air to and through the housing chamber, means disposed on the housing for sensing the pressure within the chamber, means connected to the sensing means for receiving and processing signals therefrom corresponding to sensed pressures; and means coupled to the receiving and processing means for transmitting processed signals corresponding to the sensed pressures to the control unit of the system. Preferably, such device includes additional means for sensing ambient pressure and the temperature of the interior of the tire and transmitting such data to the control unit, and a battery for powering the sensors, processor and transmitter of the device. It further is preferred that such device be provided with a transmitter/receiver so that it may be activated, deactivated and queried by the control unit.

BRIEF DESCRIPTION OF THE DRAWINGS

The invention will be described below in detail with reference to several drawings, in which.

DETAILED DESCRIPTION OF THE INVENTION

Figure 1:
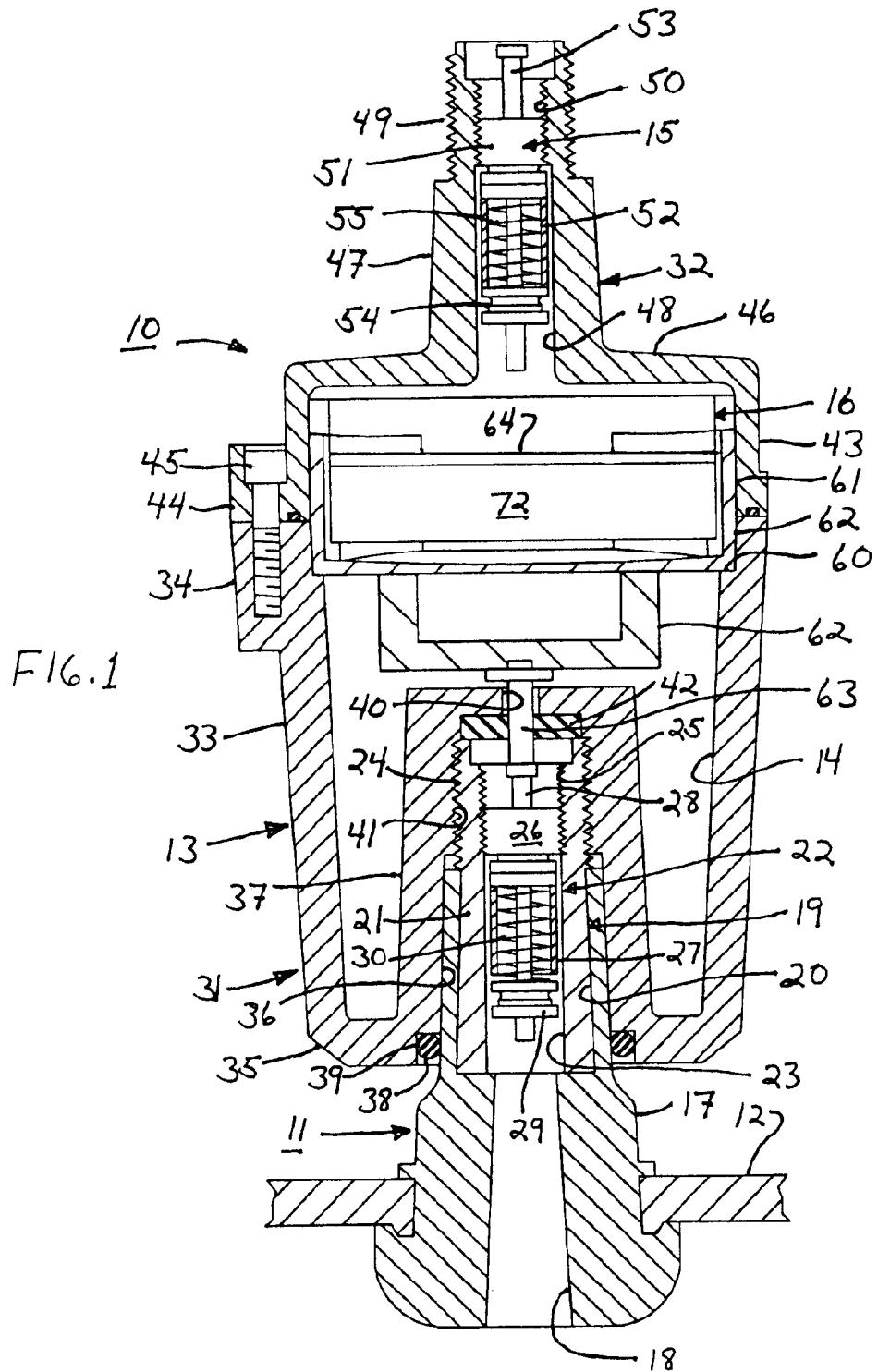
FIG. 1 is a vertical cross section of a sensor device embodying the present invention.

Referring to the drawings, there is illustrated a system for monitoring certain conditions of an inflatable tire of a vehicle which generally consists of at least one sensor device 10 mountable on a valve stem 11 of a tire 12 and a control unit 79 which may be either mountable on the vehicle or detached for use as a portable unit. The sensor device includes a housing 13 defining a chamber 14, a valve 15 and electronics module 16. Valve stem 11 is of a conventional construction consisting of an elongated body member 17 having a longitudinal bore 18 therethrough and a valve core 19 disposed in an enlarged section 20 of bore 18. Valve core 19 includes a substantially cylindrical body member 21 seated in enlarged section 20 and a valve 22 disposed in a longitudinal bore 23 therein. The free end of cylindrical body member 21 is provided with a set of exterior threads 24 and a set of interior threads 25.

Valve core 19 is of a conventional construction found in most valve stems and includes a base section 26 provided with a set of external threads to permit the valve to be threaded into cylindrical body member 21, a cylindrical section 27 depending from base section 26, a pin 28 extending through base section 26 and depending cylindrical section 27, a valve element 29 mounted on a lower free end of pin 28 and engageable with an edge of cylinder section 27 comprising a valve seat and a spring 30 disposed between base section 26 and valve element 29 which functions to bias pin 28 in an upward direction as shown in FIG. 1 to cause valve element 29 to engage and thus be seated on the lower edge of cylindrical section 27 to close the valve. Base section 26 further is provided with an internal passageway intercommunicating the space above base section 26 and the interior of cylindrical section 27. Under normal conditions, spring 30 assisted by pressure within the tire will cause valve element 29 to be seated on the lower edge of cylindrical section 27 to maintain the valve in the closed condition. The valve may be opened simply by depressing the upper end of pin 28 to unseat valve element 29 against the biasing action of spring 30. When the valve is thus opened, the space above base section 26 communicates with the lower end of bore 23 through the internal passageway in base section 26 and cylindrical section 27.

Housing 13 generally consists of a cup-shaped base member 31 and a cooperating cap member 32. The base member has a substantially frusto-conical side wall 33 provided with a set of circumferentially spaced projections 34 at the open end thereof and an end wall 35. The end wall is formed with a recess 36 which is disposed axially relative to side wall 33 and is defined by a section 37 having a frusto-conical configuration inverted relative to side wall 33. The outer end of recess 36 is enlarged as at 38 to accommodate an O-ring seal 39, and the inner end thereof is provided with an axially disposed opening 40. Recess 36 has essentially the same configuration as the upper end of valve stem 11 which is adapted to be received therein as shown in FIG. 1. It further is provided with a set of internal threads 41 to permit the device 10 to be threaded onto the upper end of the valve stem, on threads 24, as shown in FIG. 1. Disposed at the inner end of recess 36 is an annular sealing gasket 42 which is adapted to be interposed between the upper end of the valve stem and the end portion of section 37 when the sensor device 10 is mounted on the valve stem as shown in FIG. 1. O-ring 39 and gasket 42 function to provide seals between the sensor device and the valve stem except for opening 40.

Cap member 32 includes a cylindrical section 43 having a circular edge adapted to be seated on an annular edge of wall section 33 and a plurality of circumferentially spaced, projections 44 equal in number to and registrable with projections 34 to permit the cap member to be secured to the base member by means of a set of screws 45, an end wall section 46 and a cylindrical neck section 47.

The free end of neck section 47 has a reduced outer diameter and is provided with a set of external threads 49 to accommodate a threaded closure cap, and an internal set of threads 50. Threaded within opening 48 on threads 50 is valve core 15. Valve core 15 is disposed in axial alignment with valve core 19 and the combination of neck section 47 and valve core 15 have essentially the same configuration as that portion of valve stem 11 received within recess 36 including valve core 19. Valve core 15 includes a base section 51 adapted to be threaded onto internal threads 50 of opening 48, a cylindrical section 52 depending from the base section and having a circular edge defining a valve seat, a pin 53 extending through base section 51 and cylindrical section 52, a valve element 54 mounted on an inner end of pin 53 and adapted to engage the valve seat provided on the end of cylindrical section 52 and a spring 55 which functions to retain valve element 54 seated on the valve seat provided by cylindrical portion 52. Base section 26 further includes a passageway therethrough intercommunicating the exterior of the device and the interior of cylindrical section 52.

The free, inner end of wall section 33 is enlarged to provide an annular shoulder 60 onto which there is adapted to be seated a holder 61. The holder consists of an open, cup-shaped member seated on annular shoulder 60 which is adapted to be received partially within base member 31 and cap member 32 when the cap member is mounted on the base member as shown in FIG. 1, and a depending section 62. Mounted on depending section 62 is an actuating pin 63 which is disposed in axial alignment with pin 28 of valve core 22, extends through opening 40 and gasket 42 and depresses pin 28 to open valve core 22 when holder 61 is mounted on annular surface 60 and cap member 32 is mounted on base member 31 as shown in FIG. 1. Holder 61 supports a printed circuit board 64 on which there is mounted an ambient air temperature sensor 65, a tire air temperature sensor 66, a pressure sensor 67, a radio transceiver 68 including a transmitter 69 and a receiver 70 and a microcontroller 71, shown schematically in FIG. 2, and a battery 72 for powering the sensors, microcontroller and transceiver.

Figure 2:
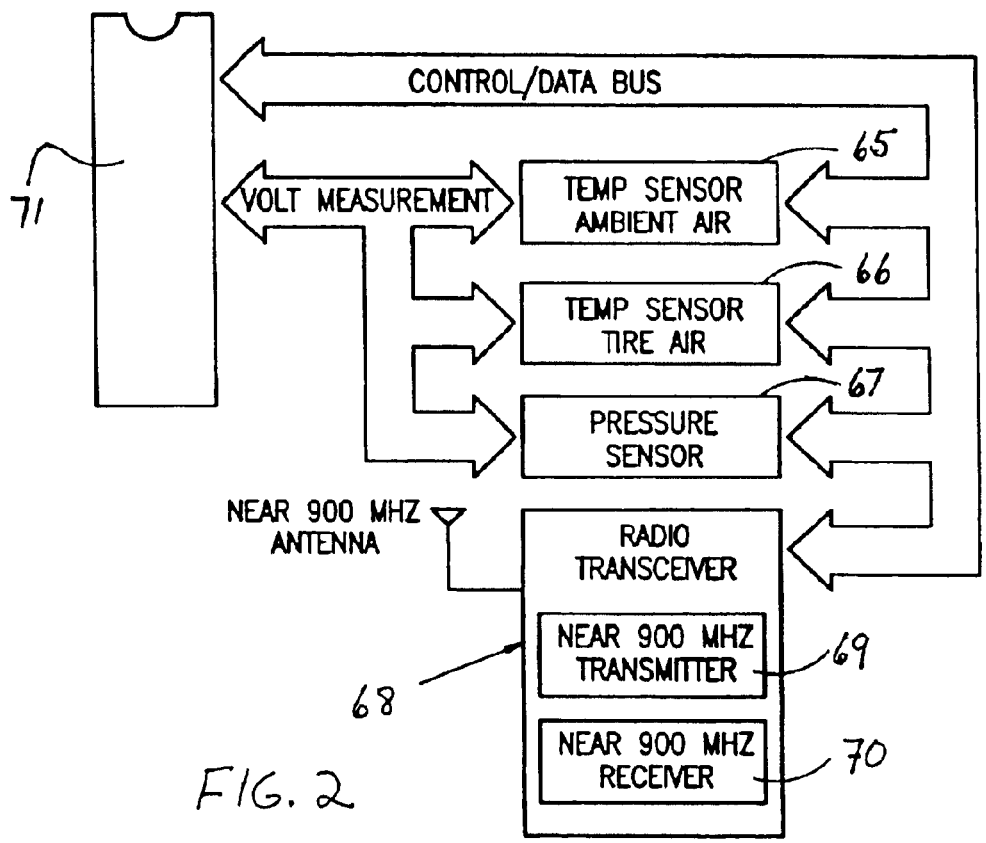
FIG. 2 is a schematic of the electronic components of the sensor device shown in FIG. 1.
Figure 3:
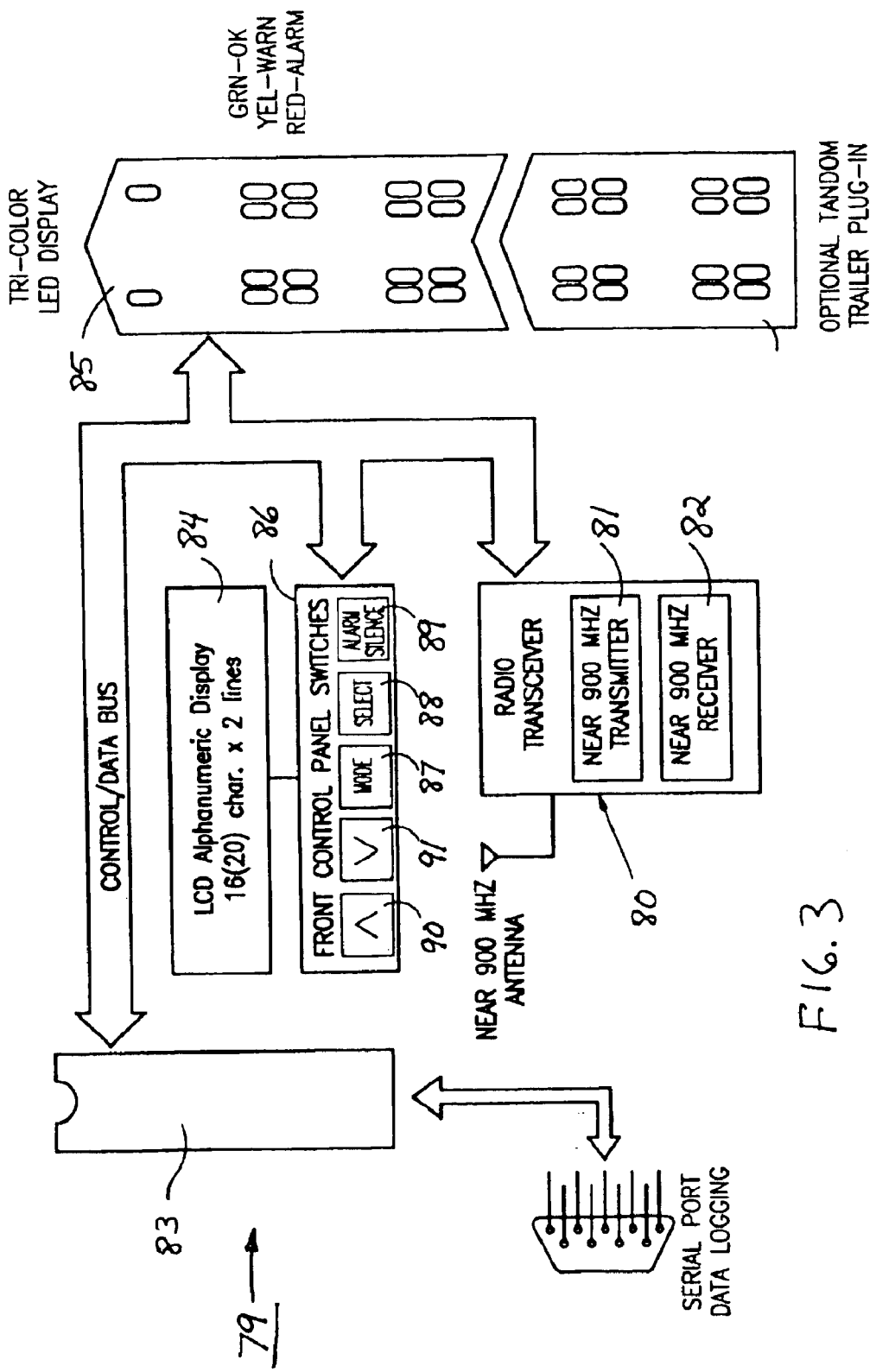
FIG. 3 is a schematic of the electronic components of the control unit for the sensor device shown in FIGS. 1 and 2.

When sensor device 10 is screwed onto valve stem 11 as shown in FIG. 1, actuating pin 63 of holder 61 will cause pin 28 of valve 22 to be depressed and thus unseat valve element 29. Under such conditions, an air passageway will be formed through opening 40, the inner opening of gasket 42, the internal passageway in base section 26, cylindrical section 27 and opening 18 to intercommunicate the interior of tire 12 and chamber 14 of housing 13. Under such circumstances, the temperature and pressure of the air in chamber 14 will be at the same temperature and pressure as the air in the tire and may be sensed by sensors 65, 66 and 67. As described in greater detail in U.S. Pat. No. 6,034,596, whenever the electronics unit in sensor device 10 as illustrated schematically in FIG. 2 is activated, sensors 65, 66 and 67 function to sense ambient air temperature, interior tire temperature and interior tire pressure, microcontroller 71 functions to process data signals from the sensors and transmitter 69 functions to transmit processed data signals from the microcontroller to control unit 79.

Control unit 79 may be powered by batteries or connected to the electrical system of a vehicle. It consists of a bi-directional radio transceiver 80 including a transmitter 81 and a receiver 82 which transmit and receive signals to and from transceiver 68 of the sensor device, an ultra-low powered CMOS microcontroller 83 which queries the sensor device, receives sensing signals from transmitter 69, processes such signals and supplies measured readings to an alpha-numeric display module 84 and tire status to a display 85, and a keypad 86. The keypad includes mode and select buttons of 87 and 88, an alarm silence button 89 and up and down control buttons 90 and 91 for parameter entry.

In the operation of the system as described, the sensor device is mounted on the valve stem of a tire to be monitored as shown in FIG. 1 and power is supplied to the control unit. A self diagnostic check is made initially involving the displays, communication with the sensing device and the system electronics. The control unit then transmits a wake up call to the sensor device. Such signal activates the electronics of the sensor unit from its normal lower power mode. The sensors in device 10 then measure pressure and temperature and transmit signals corresponding to such data and location data to receiver 82 of the control unit. Such data is then displayed on displays 84 and 85. In applications where a plurality of sensor devices are employed such as on a set of tires of a vehicle, the control unit is operable to query each of such devices and displays the sensed data on the display of the control unit. A more detailed description of the monitoring of one or more sensor devices by the control unit is provided in U.S. Pat. No. 6,034,596.

Although sensor device 10 may be removed from the valve stem of a tire simply by unscrewing it from the valve stem, it is intended to be permanently mounted thereon. Such permanent mounting will not interfere with either checking or adjusting the pressure of the tire in that either a pressure gauge or compressed air hose may be connected to the outer end of the device. Whenever a pressure gauge or a compressed air line is applied to the outer end of the sensor device, a protruding portion of the gauge or connecting fixture of a compressed air line will cause pin 53 of valve core 15 to displace axially and thus unseat valve element 54. Under such circumstances, the gauge or line-connecting fixture will communicate with the interior of the tire through the sensor device. The pressure in the tire may thus be gauged, increased or decreased without removal and replacement of the sensor device.

Housing 13 may be formed of any suitable dielectric material and by any method. Preferably, the housing is molded of a plastic material such as ABS. Although the housing has been described as having a particular configuration consisting of two components and secured together by a set of screws, it will be appreciated that it may be formed in any suitable configuration providing a set of valve cores as described to permit the gaging or adjusting of the tire pressure without removing the sensor device. It may consist of any number of components and may have any components thereof secured together by any suitable means.

In the preferred embodiment of the invention, the control unit functions to query each sensor device mounted on one or more vehicles with unique electronic identification or serial numbers that activate each sensor device to transmit data. The control unit may be permanently or removably mounted on a vehicle or be used as a portable unit. Furthermore, the system may be used to determine vehicle weight or its load. By using pressure and temperature measurements and incorporating information regarding tire volume, flexing properties and appropriate calculation factors, weight can be determined. By comparing the different weights on the tires, a load-balance parameter may be calculated to properly load the vehicle In an alternative embodiment of the invention, shown in FIG. 4, the sensor device 10 is provided with a dust prevention mechanism, comprising a ball member 94 and a spring 95. The dust prevention mechanism is a closure device that prevents dust from contacting the valve core 15 of the sensor device 10.

Figure 4:
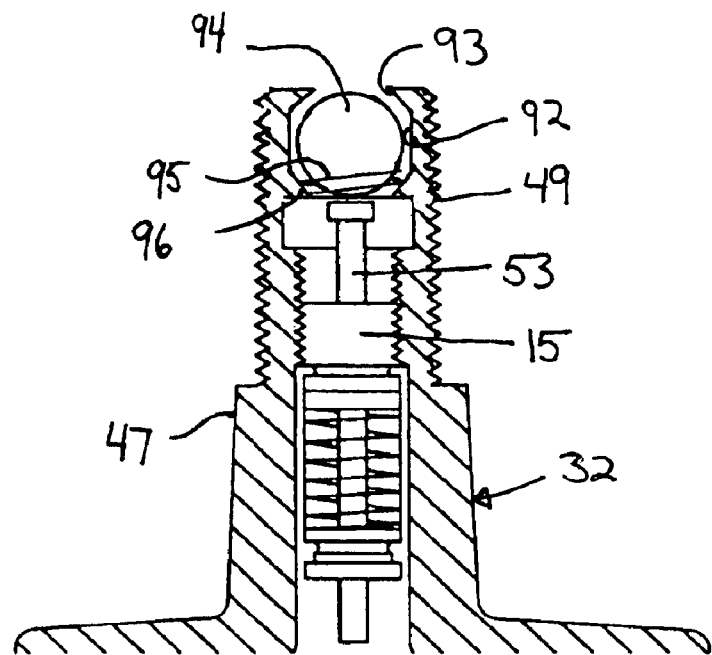
FIG. 4 is a vertical cross section of a sensor device according to another embodiment.

In this embodiment, neck section 47 of cap member 32 is extended out from its length of the previous embodiment. The outer threads 49 are also extended. The upper segment of neck section 47 has a chamber 92 that intercommunicates the valve core 15 of the cap member 32 with the exterior of the cap member. The chamber 92 contains ball member 94, which is prevented from moving outside the chamber 92 via chamfers 93, 96 on an upper and lower side of the chamber 92. As ball member 94 moves against chamfer 93, the chamber 92 is sealed from the environment and debris outside the cap member 32 and prevents dust from contacting valve core 15. A spring 95 biases ball member 94 into contact with chamfer 93. In its operation, when a line connecting fixture is attached to cap member 32 to inflate the tire, the air pressure against the ball member 94 causes the spring 95 to collapse moving the ball member away from the chamfer 93, which is shown in FIG. 4. Air may then pass through the chamber 92. The ball member 94 may also be manipulated manually. The tire may then be filled in a normal manner.

Figure 5:
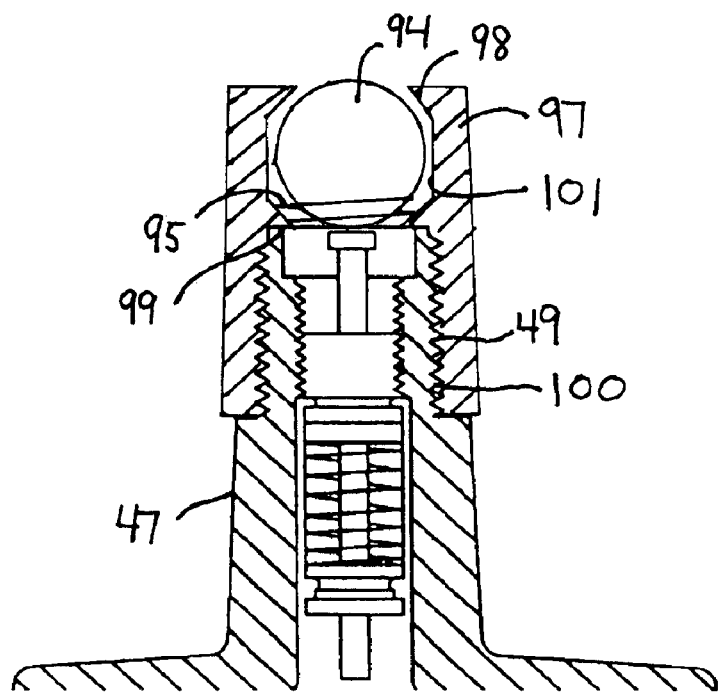
FIG. 5 is a vertical cross section of a sensor device having a dust cap mounted thereon.

In an alternative to incorporating the dust prevention mechanism into the neck portion of device 100, the dust prevention mechanism may be in the form of a dust cap 97, which is shown in FIG. 5. The general operation of the dust cap 97 is analogous to the operation of the dust prevention mechanism shown in FIG. 4, the difference being the components are separated. Dust cap 97 has inner threads 100 that screw onto outer threads 49 of neck section 47. Dust cap 97 is provided with a cap chamber 101 having chamfers 98 and 99 on an upper and lower side thereof. A similar ball member 94 and spring 95 are also shown.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A sensor device mountable on a valve stem of an inflatable tire of a vehicle, having an actuating pin adapted to be depressed by a component of a gauge or connecting fixture of a compressed air line coupled to said valve stem, comprising:

a housing defining a closed chamber, having a first threaded opening permitting said housing to be threaded onto said valve stem, and a second opening;

means supported on said housing engageable with said actuating pin of said valve stem for depressing said actuating and thereby opening said valve stem when said housing is threaded onto said valve stem, intercommunicating the interiors of said tire and said housing;

a valve disposed in said second opening having an actuating pin adapted to be depressed by said component of said air gauge or line connecting fixture to provide a passageway through said housing when one said housing is mounted on said valve stem;

means disposed on said housing for sensing the pressure within said chamber;

means connected to said sensing means for receiving and processing signals therefrom corresponding to sensed pressure; and means coupled with said receiving and processing means for transmitting processed signals corresponding to said sensed pressures.

2. A device according to claim 1 including means for supplying power to said sensing, processing and transmitting means.

3. A device according to claim 2 wherein said power supplying means comprises the electrical system of said vehicle.

4. A device according to claim 2 wherein said power supplying means comprises a battery mounted on said housing.

5. A device according to claim 1 including means disposed on said housing for sensing temperature within said chamber and wherein said processing means is connected to said temperature sensing means for receiving and processing sensed temperatures and said transmitting means is operable to transmit processed signals corresponding to said sensed temperatures.

6. A device according to claim 5 including means disposed on said housing for sensing ambient temperature and wherein said processing means is connected to said ambient temperature sensing means for receiving and processing sensed ambient temperatures and said transmitting means is operable to transmit signals corresponding to said ambient temperatures.

7. A device according to claim 1 wherein said processing means comprises a microcontroller.

8. A device according to claim 1 wherein said transmitting means comprises a transmitter/receiver.

9. A device according to claim 1 wherein said housing includes a recess for receiving said tire stem therein, said first opening is disposed at an inner end of said recess, and a wall defining said recess includes a set of threads which may be threaded onto said valve stem.

10. A device according to claim 1 wherein said housing is formed of a dielectric material.

11. A device according to claim 1 wherein said housing is formed of a molded plastic material.

12. A device according to claim 1 including a seal mounted on said housing about said first opening engageable in sealing relation with said valve stem when said device is mounted on said valve stem.

13. A device according to claim 1 wherein said valve disposed in said second opening includes a valve seat, a valve head connected to said pin thereof and engageable with said valve seat and a spring biasing said valve head into engagement with said valve seat.

14. A device according to claim 1 wherein the sensor device further includes a dust prevention mechanism disposed within a third opening located adjacent the second opening, said mechanism comprising:
- a ball member disposed within the third opening closing the passage between the second opening and an exterior of the housing in a closing position; and
- a biasing means for biasing the ball member in said closing position.

15. A device according to claim 1, wherein the housing adjacent to the second opening is provided with a dust prevention mechanism.

16. A device according to claim 15, wherein said dust prevention mechanism comprises:
- a cap threaded attached to said housing having a chamber therein providing a passage from the valve in the second opening to an exterior of the housing; and
- a ball member disposed in the chamber for closing the passage,
- wherein the ball member is biased into a closing position by a biasing means.

17. A device according to claim 16 wherein the biasing means is a spring.

18. A system for monitoring certain conditions of at least one inflatable tire of a vehicle, having a valve stem provided with an actuating pin adapted to be depressed by a component of an air gauge or a connecting fixture of a compressed air line coupled to said valve stem, comprising:
- a sensor device including:
  - a housing defining a closed chamber, having a first threaded opening permitting said housing to be threaded onto said valve stem, and a second opening:
  - abutment means disposed in said housing engageable with said actuating pin of said valve stem for depressing said actuating pin and thereby opening said valve stem when said housing is threaded onto said valve stem, intercommunicating the interiors of said tire and said housing;
  - a valve disposed in said second opening having an actuating pin adapted to be depressed by said component of said air gauge or compressed air line connecting fixture to provide a passageway through said housing;
  - means disposed on said housing for sensing the pressure within said housing;
  - means connected to said sensing means for receiving and processing signals therefrom corresponding to sensed pressure; and
  - means coupled to said receiving and processing means for transmitting signals corresponding to said sensed pressures; and
- a control unit detached from said sensor device including means for transmitting and receiving signals to and from said sensor device, means for processing said signals and means for displaying data corresponding to processed signals.

19. A system according to claim 18 wherein said control unit is operable to query said sensor device and said sensor device is operable to respond thereto.

20. A system according to claim 18 wherein said control unit is operable to transmit signals for activating and deactivating said sensor device.

21. A system according to claim 19 wherein said control means is operable to query and thus identify a plurality of sensor devices.

22. A system according to claim 18 wherein said control unit includes a microcontroller, a bi-directional radio transceiver, an alpha-numeric display module, physical status indicators and a data keypad.

23. A system according to claim 18 including at least two of said sensor devices.

24. A system according to claim 18 wherein said sensor device includes means for supplying power to said sensing, processing and transmitting means.

25. A system according to claim 24 wherein said sensor device includes means for supplying power to said sensing, processing and transmitting means.

26. A system according to claim 24 wherein said power supply means of said sensor device comprises a battery mounted on said housing.

27. A system according to claim 18 wherein said sensor device includes means disposed on said housing thereof for sensing temperature within said chamber, and wherein said processing means of said sensor device is connected to said temperature sensing means for receiving and processing sensed temperatures and said transmitting means of said sensor device is operable to transmit processed signals corresponding to said sensed temperatures to said control unit.

28. A system according to claim 27 wherein said sensor device includes means disposed on said housing for sensing ambient temperature and wherein said processing means of said sensor device is connected to said ambient temperature sensing means for receiving and processing ambient temperatures and said transmitting means of said sensor device is operable to transmit processed signals corresponding to said ambient temperatures to said control unit.

29. A system according to claim 18 wherein said processing means of said sensor device comprises a microcontroller.

30. A system according to claim 18 wherein said transmitter means of said sensor device comprises a transmitter/receiver.

31. A system according to claim 18 wherein said housing of said sensor device includes a recess for receiving said tire stem therein, said first opening of said housing is disposed at an inner end of said recess and a wall of said housing defining said recess includes a set of threads which may be threaded onto said valve stem.

* * * * *

UNITED STATES PATENT AND TRADEMARK OFFICE
CERTIFICATE OF CORRECTION

PATENT NO. : 6,856,245 B2
APPLICATION NO. : 10/615192
DATED : February 15, 2005
INVENTOR(S) : Smith et al.

It is certified that error appears in the above-identified patent and that said Letters Patent is hereby corrected as shown below:

Claim 1, at line 11 "actuating and" should read --actuating pin and--.

Claim 16, at line 3, "cap threaded" should read --threaded cap--.

Signed and Sealed this

Twenty-sixth Day of December, 2006

JON W. DUDAS
*Director of the United States Patent and Trademark Office*